Dec. 17, 1940.   E. J. HECHLER   2,224,867
SAW
Filed Nov. 8, 1938
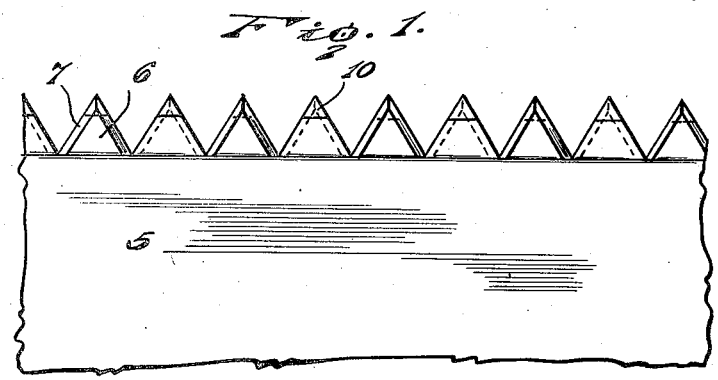
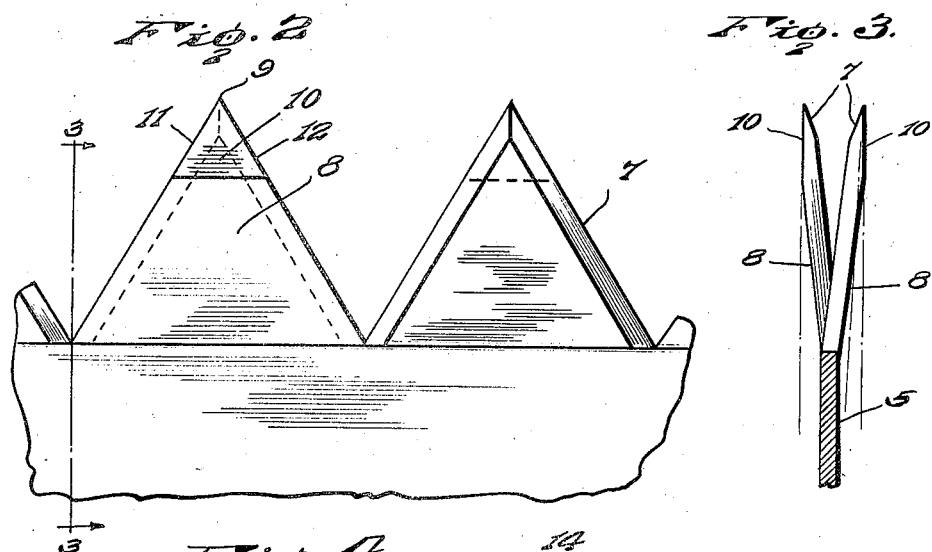
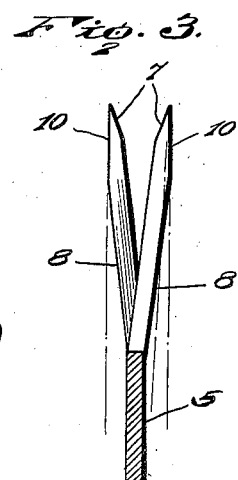
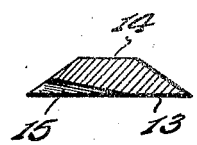
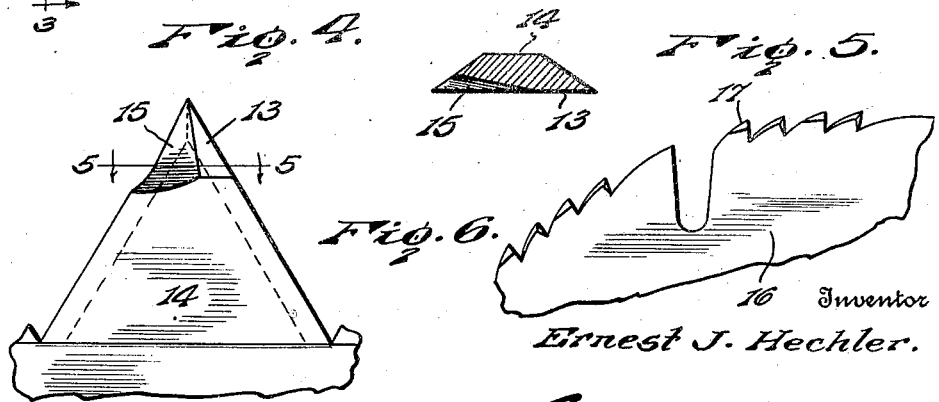
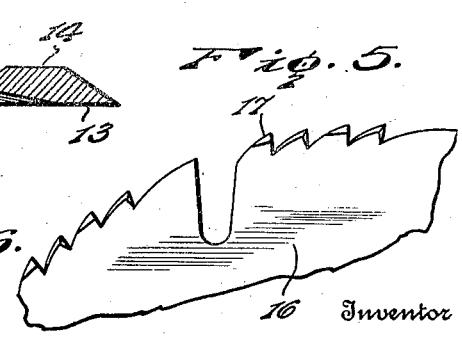
Inventor
Ernest J. Hechler.
By Lacey & Lacey
Attorneys Patented Dec. 17, 1940

2,224,867

UNITED STATES PATENT OFFICE 2,224,867

SAW

Ernest J. Hechler, Troy, Mo.

Application November 8, 1938, Serial No. 239,582

1 Claim. (Cl. 143—140)

This invention relates to saws and more particularly to the construction of the cutting teeth thereof.

The object of the invention is to provide a saw of simple and inexpensive construction which will cut through boards, logs and other lumber with a minimum effort on the part of the operator and which will produce a perfectly smooth glass-like surface at the cut end of the lumber so as to render it unnecessary to subsequently plane or otherwise finish said cut end in order to match the end of an adjacent strip of lumber.

A further object of the invention is to provide a saw, the ends of the cutting teeth of which are inclined or beveled in the direction of the points thereof, after said teeth have been set, so as to provide each tooth with oppositely disposed converging cutting edges which cut into and plane the wood on both the up and down stroke of the saw so that the walls of the kerf in the lumber will be smooth and devoid of ridges, saw tooth markings and other irregularities.

A further object is to provide a novel construction and arrangement of cutting teeth which may be used with equally good results on either rip or cross cut saws or saws of the circular type and in which ample clearance is provided between the teeth so as to prevent wedging or sticking of the saw blade in the lumber during the sawing operation.

A further object is to provide a novel method or process of filing the teeth after said teeth have been sharpened and set.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a side elevation of a portion of a saw blade embodying the present invention, Figure 2 is a similar view on an enlarged scale showing the construction of the teeth of the saw, Figure 3 is a vertical transverse sectional view taken on the line 3—3 of Figure 2, Figure 4 is a side elevation of a saw tooth showing a modified form of the invention, Figure 5 is a horizontal sectional view taken on the line 5—5 of Figure 4, and Figure 6 is a perspective view of a portion of a circular saw showing the invention applied thereto.

The improved device forming the subject-matter of the present invention may be used in connection with cross cut saws, rip saws, circular saws or any other type of saw, and in Figure 1 of the drawing is shown in connection with a cross cut saw, in which 5 designates the blade, the teeth 6 of which are sharpened at 7 and set in the usual manner.

In carrying the invention into effect, I file or otherwise cut the smooth face 8 of each tooth longitudinally thereof in the direction of the point 9 of the tooth to provide a beveled surface 10 disposed at an angle to the set of the tooth and defining oppositely disposed cutting edges 11 and 12. These cutting edges 11 and 12 operate on the lumber with a planing action when the saw is in use and produce a smooth glass-like surface devoid of ridges, saw tooth markings and other irregularities. The beveled surface 10 preferably extends for approximately one-third of the length of the tooth, but it will, of course, be understood that the length of the beveled surface is optional and may be varied according to the conditions under which the saw is to be used. By reference to Figure 1 of the drawing, it will be noted that, while the pointed end of each tooth is provided with a beveled surface 10, said beveled surfaces are alternately disposed when the saw is viewed in side elevation so that the edges thereof cut through the lumber on both the up and down stroke of said saw. By reference to Figure 3 of the drawing, it will be noted that the beveled portion 10 is disposed substantially parallel to the vertical plane of the body of the blade 5, but the inclination of the bevel may be varied if desired so that said bevel will be disposed at an angle to the saw blade as well as to the set of the saw tooth, as indicated by dotted lines in said figure.

In applying the invention to a standard saw, the teeth of the latter are first sharpened and set in the usual manner. The saw is then supported on a table or other flat surface with the blade 5 in contact therewith and by means of a file or other abrasive tool the beveled portions 10 are formed on the teeth on one side of the saw by pressing the file against the teeth and moving said file longitudinally thereof. After the teeth on one side of the saw have been sharpened, the saw is reversed and the same operation repeated on the teeth on the other side of the saw so that the outer surfaces of alternate set teeth on both sides of the saw will be provided with said beveled faces, the cutting edges of which, as previously stated, exert a planing action on the lumber on both the down and up stroke of the saw therethrough so that the cut edges of the lumber will be devoid of ridges and other irregularities.

In Figure 4 of the drawing, there is illustrated a modified form of the invention, in which one side of the beveled face 13 of the tooth 14 is curved or chamfered at 15 for the major portion of the width of said beveled face so as to assist in preventing wedging or sticking of the blade in the saw kerf during the sawing operation. This form of the device is particularly designed for use in connection with rip saws or other saws having a one-way cut.

The beveled faces of the set teeth may also be used with equally good results on circular saws, and in Figure 5 of the drawing, I have shown a circular saw, a portion of which is indicated at 16, and the teeth of which are provided with said beveled or inclined faces 17 for the purpose previously set forth.

A saw equipped with my invention does not increase the cost of manufacture thereof while at the same time provides a saw which is easier to operate and which will produce a smooth cut in the lumber so as to render it unnecessary to subsequently plane or otherwise finish the cut end or ends in order to match the end of an adjacent strip of lumber.

It will, of course, be understood that the saws may be made in different sizes and shapes according to the work intended to be performed without departing from the spirit of the invention.

Having thus described the invention, what is claimed as new is:

A saw comprising a blade having teeth sharpened and set, said teeth having the outer faces of their free end portions beveled longitudinally to provide surfaces extending at an incline longitudinally of the plane of set of said teeth and the beveled surface of each tooth having a chamfered portion forming a relieved portion extending transversely thereof for a portion of the width of the tooth some distance back of its leading edge.

ERNEST J. HECHLER.